United States Patent [19]

Haendle

[11] Patent Number: 4,722,097
[45] Date of Patent: Jan. 26, 1988

[54] X-RAY DIAGNOSTICS INSTALLATION WITH SPATIAL FREQUENCY HIGH-PASS FILTERING

[75] Inventor: Joerg Haendle, Erlangen, Fed. Rep. of Germany

[73] Assignee: Siemens Aktiengesellschaft, Berlin and Munich, Fed. Rep. of Germany

[21] Appl. No.: 934,811

[22] Filed: Nov. 25, 1986

[30] Foreign Application Priority Data

Dec. 20, 1985 [DE] Fed. Rep. of Germany ....... 3545348

[51] Int. Cl.$^4$ ............................................. G03B 41/02
[52] U.S. Cl. ...................................... 378/99; 358/111
[58] Field of Search ........................ 378/99, 134, 138; 358/111

[56] References Cited

U.S. PATENT DOCUMENTS 4,559,557 12/1985 Keyes et al. ............................ 378/99
4,663,773 5/1987 Haendle et al. ...................... 358/111

FOREIGN PATENT DOCUMENTS 2549327 7/1983 France .
985518 8/1960 United Kingdom .
1128852 2/1966 United Kingdom .

Primary Examiner—Carolyn E. Fields
Assistant Examiner—Joseph A. Hynds
Attorney, Agent, or Firm—Hill, Van Santen, Steadman & Simpson

[57] ABSTRACT

An X-ray diagnostics installation with spatial frequency high-pass filtering has an X-ray tube, in image intensifier video chain, first and second image memories, and a difference stage for subtracting images in the memories and thereby forming a difference signal between first video signals and chronologically succeeding second video signals. The resulting image is displayed on a monitor. The installation further has a control unit for controlling the size of the tube focus. A video signal for an X-ray exposure produced using a first size of the tube focus is entered into one of the memories, and this signal is subtracted in the difference stage from a video signal for an X-ray exposure produced with a second size of the tube focus.

3 Claims, 2 Drawing Figures

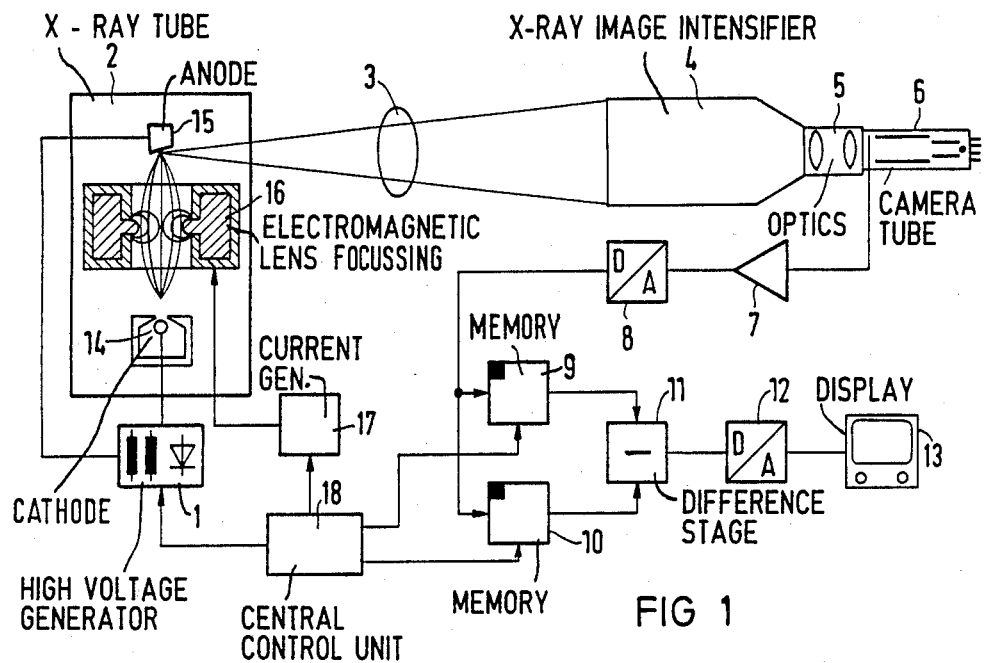
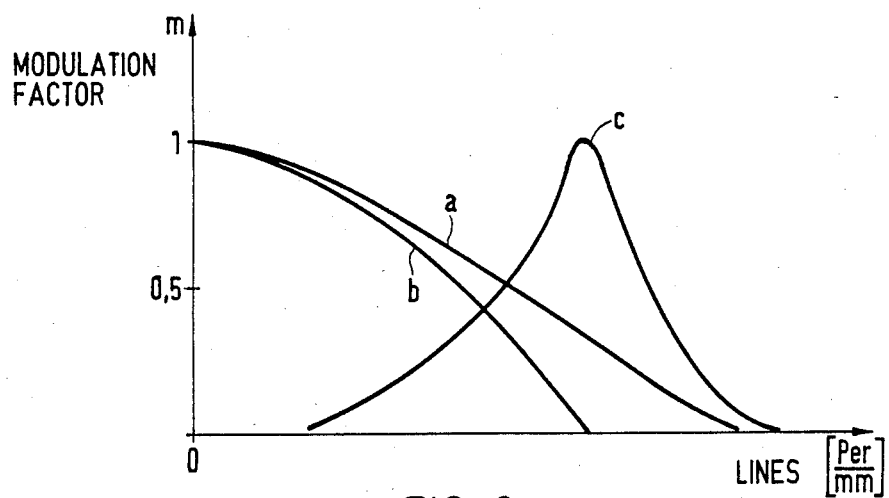

X-RAY DIAGNOSTICS INSTALLATION WITH SPATIAL FREQUENCY HIGH-PASS FILTERING

BACKGROUND OF THE INVENTION

1. Field of the Invention

The present invention relates to an X-ray diagnostics installation with spatial frequency high-pass filtering, and in particular to such a diagnostics installation having first and second memories and a difference stage for producing subtraction images from successive video signals.

2. Description of the Prior Art

An X-ray diagnostics installation is known from German Pat. No. 12 24 352, corresponding to British specification No. 1,128,852, having spatial frequency high-pass filtering and having first and second memories in which chronologically successive video signals are stored, and a difference stage for producing subtraction images from the signals stored in the memory. The subtraction images displayed on a monitor of this type of X-ray diagnostics installation are particularly suited for enhancing fine contrasts in X-ray pictures. This known system has a video high-pass filter making use of a camera tube as a storage means. The filter is disposed in the transmission channel of the system. As a result, large-area contrast regions are attenuated, whereas the high frequency signal components, which represent the fine contrasts, are intensified. The current video signal is subtracted from the filtered signal or the difference signal by two differencing stages. The degree of enhancement is set by an adjustable amplifier. An intensification of the fine contrasts in this known system is, however, noticeably limited due to inteference structures of the transmission components, for example, due to interference structures of the input luminescent screen or the semiconductor layer of the camera tube.

SUMMARY OF THE INVENTION

It is an object of the present invention to provide an X-ray diagnostics installation with spatial frequency high-pass filtering wherein the fine contrasts required in X-ray technology are intensified without interference structures generated by the system components so that the ability to recognize fine details in the X-ray pictures is improved.

The above object is achieved in accordance with the principles of the present invention by the use of control means connected to the X-ray tube for controlling the size of the tube focus. A video signal for an X-ray exposure produced given a first size of the tube focus is entered into a memory. This signal is subtracted from a previously stored video signal for an X-ray exposure recorded using a second size of the tube focus. The subtraction takes place in a difference stage. Two transfer functions having respectively different limited frequencies thus result. The subtraction of these two transfer functions yields a resulting transfer function wherein the low frequencies are suppressed and the higher frequencies are amplified.

DESCRIPTION OF THE DRAWINGS

FIG. 1 is a schematic block diagram of an X-ray diagnostics installation constructed in accordance with the principles of the present invention.

FIG. 2 is a graph of various modulation transfer functions for explaining the operation of the apparatus shown in FIG. 1.

DESCRIPTION OF THE PREFERRED EMBODIMENTS

An X-ray diagnostics installation is shown in FIG. 1 which includes a high voltage generator 1 which supplies an X-ray tube 2 with high voltage. The X-ray tube 2 generates an X-ray beam which penetrates a patient or other subject 3 and generates a radiation image on the input luminescence screen of an X-ray image intensifier 4. The radiation image, converted into a visible image by the image intensifier 4, is directed by optics 5 onto the target of a camera tube 6. A video signal taken from the target is amplfied in a video amplifier 7, and is supplied to an analog-to-digital converter 8. The output of the converter 8 is supplied to two image memories 9 and 10. The respective outputs of the image memories 9 and 10 are supplied to a difference stage 11. The difference stage 11 is connected to a digital-to-analog converter 12. The analog output signal of the converter 12 is supplied to a monitor 13. The structure thus far described corresponds to known X-ray video means employing conventional digital subtraction techniques.

The X-ray tube 2 has a cathode 14 and an anode 15 connected to the high voltage generator 1. When high voltage is present across these electrodes, electrons are emitted from the cathode 14 and are incident of the target surface of the anode 15, thereby generating the X-ray beam. For focussing these electrons, an electromagnetic lens is provided surrounding the electron beam path. The electromagnetic lens 16 is connected to a focussing current generator 17. A central control unit 18 is connected to the high voltage generator 1, to the focussing current generator 17, and to the image memories 9 and 10. The control unit 18 controls energization of the high-voltage generator 1, switching of the focussing current generator 17, and alternating write-in of the current video signal into the respective image memories 9 and 10.

By means of the apparatus described above, the focus size of the X-ray tube 2 can be switched from a small focus to a large focus. Controlled by the control unit 18, the focussing current generator 17 first supplies the electromagnetic lens with a current of a selected magnitude. Subsequently, the high voltage generator 1 is energized, so that a first exposure of the patient 3 is made, for example, using a small focus. The signal resulting from this exposure is stored in one of the image memories, such as the memory 9, for example. In this first exposure, the X-ray tube operating with a small focus has a modulation transfer function having a limit frequency as shown, for example, by curve a in FIG. 2. In the graph of FIG. 2, the modulation factor m is shown with respect to the spatial frequency measured in lines per millimeter.

By modifying the focussing current under the control of the control unit 18, the focus is subsequently switched and a second exposure of the patient 3 is made, this time using a larger focus. The resulting signal is stored in the other image memory, such as the image memory 10. With the setting of a large focus, the X-ray tube 2 has a modulation transfer function with a lower limit frequency in comparison to the first setting as shown, for example, by curve b in FIG. 2. Subsequently the output signal of the image memory 10 (whose modulation transfer function corresponds to curve b) is subtracted from the output signal of the image memory 9 (whose modulation transfer function corresponds to the curve a). This results in a modulation transfer function for the difference signal which after standardization, is shown by the curve c in FIG. 2. It is clear from the graph shown in FIG. 2, therefore, that the signal components having a low spatial frequency are suppressed, being substantially eliminated after subtraction, whereas components having higher frequencies are amplified.

As a result of this technique, all interference structures of the transmission path remain the same for both exposures, and are thus eliminated by the substraction. Given an adequately high quantum number, the fine contrast is thereby considerably improved. All other interfernce structures, for example X-ray vignetting, which clearly arises given geometrical enlargement, and vignetting of the X-ray image intensifier, of the optics, and of the camera tube are eliminated. A considerable improvement in the fine contrast is thus achieved.

Instead of a magnetically focussed tube, a rotating anode tube with an electron gun and an electrostatically variable focal spot can also be employed. The setting of the focus size in such a tube is achieved by varying the electrostatic potential.

Focal spot enlargement can also be achieved by mechanical motion of the X-ray tube during the exposure time. Focal spot enlargement is also possible by means of electrostatic or magnetic deflection of the electron beam during the exposure time. If this type of enlargement is undertaken, the focal spot should be moved such that an approximately Gaussian overall intensity distribution results. Disturbing components at high spatial frequencies are thus avoided in the resulting image.

Although modifications and changes may be suggested by those skilled in the art it is the intention of the inventor to embody within the patent warranted hereon all changes and modifications as reasonably and properly come within the scope of his contribution to the art.

I claim as my invention:

1. An X-ray diagnostics installation for examining a patient comprising:
    means having an X-beam focal spot for emitting an X-ray beam for penetrating a patient;
    means for detecting an X-ray image from said X-ray beam after penetrating said patient and for converting said X-ray image into electrical signals;
    first and second image memories for respectively storing said electrical signals;
    means connected to the outputs of said first and second memories for subtracting the respective contents thereof and generating a difference signal;
    means connected to said means for emitting said x-ray beam for changing the size of said focal spot, and control means connected to said means for changing the size of said focal spot and to each of said first and second memories for alternatingly switching the size of said focal spot between two different sizes and simultaneously alternatingly respectively entering signals corresponding to exposures made with each size focal spot into said first and second memories.

2. An X-ray installation as claimed in claim 1, wherein said means for emitting said X-ray beam includes means for generating an electron beam, and wherein said means for changing the size of said focal spot comprises:
    an electromagnetic lens disposed in said means for emitting said X-ray beam surrounding said electron beam; and
    a focussing current generator connected to said electromagnetic lens and to said control means for varying the electromagnetic field generated by said electromagnetic lens in response to a signal from said control means.

3. An X-ray diagnostics installation comprising:
    means for generating an X-ray beam for penetrating a patient, said means including a cathode for emitting electrons and an anode having a surface with a focal spot on which said electrons are incident so as to limit said X-ray beam;
    means for detecting an X-ray image from said X-ray beam after penetrating said patient and for generating electrical signals corresponding to said image;
    first and second image memories to which said electrical signals are respectively supplied;
    means for subtracting the contents of one of said image memories from the contents of the other of said image memories for generating a difference signal;
    means for visually displaying said difference signal;
    an electromagnetic lens disposed in said means for generating an X-ray beam surrounding the path of said electrons between said cathode and anode;
    a focussing current generator means for supplying current to said electromagnetic lens so as to control the electromagnetic field generated thereby; and
    a central control means connected to said focussing current generator means and to said first and second memories for selectively switching said focussing current generator means between different currents for respectively alternatingly generating focal spots of two different sizes on said anode and simultaneously controlling write-in of said electrical signals to said first and second memories such that signals corresponding to exposures made using one size focal spot are entered in one of said memories and signals corresponding to exposures made using the other size focal spot are entered in the other of said memories.

* * * * *